(No Model.)
J. STEWART, Jr., & G. PEENE, Jr.,
Hand Truck.
No. 233,892.        Patented Nov. 2, 1880.
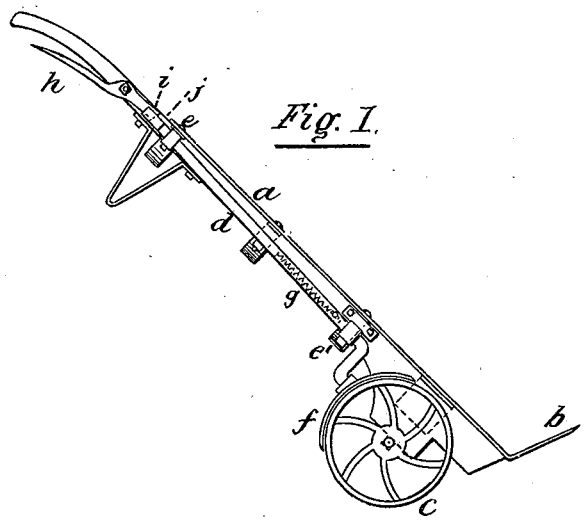
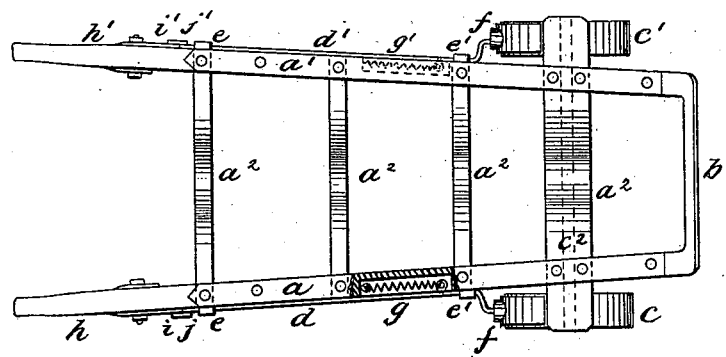
Witnesses.
H. D. Williams
John D. Shedlock
James Stewart Jr.
George Peene Jr.
Inventors.
per Alfred Shedlock
atty.

UNITED STATES PATENT OFFICE.

JAMES STEWART, JR., AND GEORGE PEENE, JR., OF YONKERS, NEW YORK.

HAND-TRUCK.

SPECIFICATION forming part of Letters Patent No. 233,892, dated November 2, 1880.

Application filed July 16, 1880. (No model.)

*To all whom it may concern:*

Be it known that we, JAMES STEWART, Jr., and GEORGE PEENE, Jr., of Yonkers, Westchester county, State of New York, have invented certain new and useful Improvements in Hand-Trucks, of which the following is a specification.

This invention relates to that class of hand-trucks used for handling heavy goods in warehouses, and has for its object to enable the person using it to have more perfect control of and to handle heavy loads with greater facility than with this class of hand-trucks as heretofore made; and it consists in the application of a brake to each of the two independent wheels of the truck, so constructed and arranged that either brake may be independently operated to retard the motion of its wheel by means of handles located under the truck-handles—as, for instance, the inside wheel, in turning a corner, may be locked, or the brakes may be applied to the two wheels simultaneously to bring the truck and its load to a state of rest, or to offer sufficient resistance to the wheels in moving the load down inclines or skids of wagons, so that the man using the truck has perfect control of it, obviating the necessity of extra help in moving heavy loads down said inclines.

Hand-trucks are often used as levers to raise heavy goods, the wheels of the same acting as the fulcrum of the lever, and by the application of the brakes in such cases the wheels become a fixed fulcrum and are prevented from slipping.

The construction and operation of our improvement in hand-trucks will be fully understood by reference to the accompanying drawings in connection with the following description.

Figure 1 is a side elevation, showing the brake open; and Fig. 2 is a plan view of the same, the truck being in a horizontal position.

The body or frame of the truck is composed of the side timbers, $a$ and $a'$, curved front bar, $b$, and cross-pieces $a^2 a^2$, and the wheels $c$ and $c'$, each fitted to rotate independently of the other on the axle $c^2$, the whole of which is constructed in the ordinary manner.

Against the outer sides of the side timbers, $a$ and $a'$, are held the flat iron bars $d$ and $d'$, by means of bearing-pieces $e\ e$ and $e'\ e'$, in such a manner as to be free to move to a certain extent in a longitudinal direction. The lower ends of these bars $d$ and $d'$ are bent downward and outward and secured in the brake-shoes $f$ and $f'$, which are made to conform to and bear against about one-quarter of the peripheries of the wheels $c$ and $c'$, and they are retracted and held away from the wheels by means of the springs $g$ and $g'$, one end of each of which is secured to the bars $d$ and $d'$ and their other ends to a pin or stud fixed in a recess formed in the sides of the side timbers, $a$ and $a'$, the whole of the springs lying in said recesses and covered by the bars $d$ and $d'$, so as to be entirely out of sight and protected, as shown in the plan view, Fig. 2, in which one of the side timbers is broken away to more clearly show the spring $g$.

The brake-handles $h$ and $h'$ are made so as to conform to the shape of the under sides of the truck-handles and lie as close thereto as possible when the brakes are being applied to the wheels. They are each provided with two ears bent so as to embrace the side timbers, $a$ and $a'$, and through these ears and the side timbers bolts are passed, acting as fulcrums, on which the handles move. The outside ears of the handles $h$ and $h'$ extend along the side timbers, $a$ and $a'$, and the ends of these extensions $i$ and $i'$ are inclined or cam-shaped and bear against the ends $j$ and $j'$ of the bars $d$ and $d'$, which are correspondingly inclined or cam-shaped.

The truck-handles are longer than the brake-handles, as shown, to enable them to be firmly grasped by the hands of the person using the truck; and when it is desired to apply one of the brakes to its wheel—as, for instance, the right-hand one—then the hand is caused to press the brake-handle $h$ up toward the truck-handle, it moving as a center on the bolt which secures it to the side timber, $a$, and the inclined or cam-shaped end $i$ of the extension of the brake-handle, bearing against the inclined or cam-shaped extension $j$ of the bar $d$, causes the bar $d$ to move downward and the brake-shoe $f$ to bear against the wheel $c$. As soon as the hand releases the handle $h$ it is moved away from the truck-handle and the shoe $f$ moved away from the wheel $c$ by the retractile action of the spring $g$. The brake on the other side of the truck is operated in the same manner, as the brakes are alike in construction, but independent in their operation, so that either wheel of the truck may be retarded separately or both together, as required.

It will be observed that this improved brake attachment may be applied to ordinary hand-trucks now in use without necessitating any material alterations, and that it is entirely out of the way and does not interfere with the proper manipulation of the truck.

It is also obvious that various modifications may be made without departing from the spirit of this invention—as, for instance, the rod $d$ and handle $h$ may be connected together by a link, to act as a toggle-joint, instead of the inclined or cam-shaped ends, or one of the inclined ends provided with a slot, and a pin on the other one to keep the ends together, in both of which cases the springs $g$ may be placed between the truck-handle and brake-handle to withdraw the shoe from the wheel.

We do not claim, broadly, the application of brakes to hand-trucks having independently-moving wheels, as such application is shown in the United States Letters Patent to C. A. Daboll, No. 21,120, dated August 10, 1858, A. V. Smith, No. 73,397, dated January 14, 1868, and J. J. Collingbourn, No. 135,889, dated February 18, 1873; but

What we claim as an improvement in the art, and desire to secure by Letters Patent, is—

1. As an improvement in brakes for hand-trucks, the combination of independent brake-handles pivoted to the side bars of the truck and in close proximity to the under sides of the truck-handles, with independent brake-shoes provided with means by which they are connected to and operated by the brake-handles to cause them to independently bear on their respective wheels of the truck, substantially as and for the purpose hereinbefore set forth.

2. In independent brakes for the independently-moving wheels of a hand-truck, in combination, the handle $h$, pivoted to the side bar of the truck $g$, having the cam-extension $i$, the bar $d$, fitted to slide on the said side bar, and having a corresponding cam end, $j$, and carrying the brake-shoe $f$ on its lower end, and the retractile spring $g$, substantially as and for the purpose hereinbefore set forth.

In testimony whereof we have hereunto set our hands this 14th day of July, 1880.

JAMES STEWART, JR.
GEORGE PEENE, JR.

Witnesses:
H. D. WILLIAMS,
JOHN D. SHEDLOCK.